(12) United States Patent
Yu et al.

(10) Patent No.: US 10,929,994 B2
(45) Date of Patent: Feb. 23, 2021

(54) IMAGE PROCESSING DEVICE CONFIGURED TO GENERATE DEPTH MAP AND METHOD OF OPERATING THE SAME

(71) Applicant: Electronics and Telecommunications Research Institute, Daejeon (KR)

(72) Inventors: Hyun Kyu Yu, Daejeon (KR); Sung Weon Kang, Daejeon (KR); Bon Tae Koo, Daejeon (KR); Joo Hyun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 86 days.

(21) Appl. No.: 15/833,518

(22) Filed: Dec. 6, 2017

(65) Prior Publication Data

US 2018/0158204 A1 Jun. 7, 2018

(30) Foreign Application Priority Data

Dec. 7, 2016 (KR) .......................... 10-2016-0166132
Nov. 15, 2017 (KR) .......................... 10-2017-0152562

(51) Int. Cl.
| | | |
|---|---|---|
| *G06T 7/50* | (2017.01) | |
| *H04N 13/214* | (2018.01) | |
| *H04N 13/128* | (2018.01) | |
| *H04N 13/218* | (2018.01) | |
| *H04N 13/271* | (2018.01) | |
| *H04N 5/374* | (2011.01) | |

(52) U.S. Cl.
CPC .............. *G06T 7/50* (2017.01); *H04N 13/128* (2018.05); *H04N 13/214* (2018.05); *H04N 13/218* (2018.05); *H04N 13/271* (2018.05); *H04N 5/374* (2013.01); *H04N 2213/003* (2013.01)

(58) Field of Classification Search
None
See application file for complete search history.

(56) References Cited

U.S. PATENT DOCUMENTS

| | | | | |
|---|---|---|---|---|
| 6,856,407 | B2 * | 2/2005 | Knighton | ................ G06T 7/521 |
| | | | | 356/601 |
| 9,142,025 | B2 | 9/2015 | Park et al. | |
| 2012/0169848 | A1 * | 7/2012 | Bae | ...................... G01S 7/4861 |
| | | | | 348/46 |
| 2012/0173184 | A1 * | 7/2012 | Ovsiannikov | ........... G01S 17/08 |
| | | | | 702/97 |
| 2013/0089254 | A1 | 4/2013 | Kim et al. | |

(Continued)

OTHER PUBLICATIONS

Seungkyu Lee, "Depth Camera Image Processing and Applications", 2012 19th IEEE International Conference on Image Processing (ICIP), pp. 545-548, 2012.

(Continued)

*Primary Examiner* — Chikaodili E Anyikire
(74) *Attorney, Agent, or Firm* — Rabin & Berdo, P.C.

(57) ABSTRACT

Provided is an image processing device. The device includes an active pixel sensor array including a plurality of pixels configured to generate a plurality of signals corresponding to a target, and an image processor configured to generate a depth map about the target based on an intensity difference of two signals among the plurality of signals.

13 Claims, 12 Drawing Sheets

(56) References Cited

U.S. PATENT DOCUMENTS

| | | | |
|---|---|---|---|
| 2013/0135503 A1* | 5/2013 | Park | H03F 1/34 |
| | | | 348/308 |
| 2014/0012225 A1* | 1/2014 | Yoo | A61B 5/6835 |
| | | | 604/503 |
| 2015/0085082 A1* | 3/2015 | Zierke | H04N 13/271 |
| | | | 348/48 |
| 2016/0119611 A1 | 4/2016 | Hall et al. | |
| 2017/0052065 A1* | 2/2017 | Sharma | G01S 7/4863 |
| 2018/0106891 A1* | 4/2018 | Thurner | G01S 7/497 |

OTHER PUBLICATIONS

Xiao Xiao et al., "Advances in three-dimensional integral imaging: sensing, display, and applications [Invited]", Applied Optics, vol. 52, No. 4, pp. 546-560, Feb. 1, 2013.

* cited by examiner

IMAGE PROCESSING DEVICE CONFIGURED TO GENERATE DEPTH MAP AND METHOD OF OPERATING THE SAME

CROSS-REFERENCE TO RELATED APPLICATIONS

This U.S. non-provisional patent application claims priority under 35 U.S.C. § 119 of Korean Patent Application Nos. 10-2016-0166132, filed on Dec. 7, 2016, and 10-2017-0152562, filed on Nov. 15, 2017, the entire contents of which are hereby incorporated by reference.

BACKGROUND

The present disclosure relates to an image processing device, and more particularly, to an image processing device and a method for generating a depth map.

In recent years, electronic devices such as smart phones and wearable devices have been widely used. Such electronic devices include most image processing devices for capturing images or videos and providing them to users. As image processing devices, complementary metal-oxide semiconductor (CMOS) based image sensors are widely used. CMOS image sensors have been continuously improved in performance due to the miniaturization of semiconductor processes and the development of digital signal processing techniques.

On the other hand, as a technique for realizing 3D stereoscopic images, there is a multi-viewpoint based 3D stereoscopic imaging technique using at least two cameras (i.e., lenses). However, the multi-viewpoint based 3D stereoscopic imaging technique is difficult to achieve optical matching and also requires a plurality of cameras.

As another example for implementing 3D stereoscopic images, there is a time of flight (TOF) method. This attaches an LED or the like to the camera, radiates light of a specific wavelength band to a target, and acquires the depth information of the target based on a time delay value between a signal reflected from the target and a radiation signal. However, the TOF method is disadvantageous in that it has a limitation in measurement distance and it is difficult to use it in a surrounding environment of strong light such as outdoors or sunlight. In addition, there is an issue that a separate cell for receiving reflected light (i.e., reflected wave) near the pixel of a separate beam generation device and an image sensor is additionally required.

SUMMARY

The inventive concept provides a depth map using an existing image sensor without a separate device for generating the depth map.

An embodiment of the inventive concept provides image processing device including: an active pixel sensor array including a plurality of pixels configured to generate a plurality of signals corresponding to a target; and an image processor configured to generate a depth map about the target based on an intensity difference of two signals among the plurality of signals.

In an embodiment, the active pixel sensor array may include a first pixel to a third pixel disposed in a first row among the plurality of pixels, wherein the image processor may generate a depth map based on a first difference between a first signal corresponding to the first pixel and a second signal corresponding to the second pixel and a second difference between the second signal corresponding to the second pixel and a third signal corresponding to the third pixel.

In an embodiment, the active pixel sensor array may further include a fourth pixel to a sixth pixel disposed in a second row among the plurality of pixels, wherein the image processor may generate a depth map based on a third difference between a fourth signal corresponding to the fourth pixel and a fifth signal corresponding to the fifth pixel and a fourth difference between the fifth signal corresponding to the fifth pixel and a sixth signal corresponding to the sixth pixel.

In an embodiment, the processor may reflect a difference between the first signal and the fourth signal when calculating the third difference and the fourth difference.

In an embodiment, the active pixel sensor array may include a first pixel to a fourth pixel disposed in a first row among the plurality of pixels, wherein the image processor may generate a depth map based on a first difference between a first signal corresponding to the first pixel and a third signal corresponding to the third pixel and a second difference between the second signal corresponding to the second pixel and a fourth signal corresponding to the fourth pixel.

In an embodiment, the active pixel sensor array may include a first pixel to a fifth pixel disposed in a first row among the plurality of pixels, wherein the image processor may generate a depth map based on a first difference between a first signal corresponding to the first pixel and a third signal corresponding to the third pixel and a third difference between the third signal corresponding to the third pixel and a fifth signal corresponding to the fifth pixel.

In an embodiment, the image processing device may further include a digital signal converter configured to convert the signals to digital signals.

In an embodiment, each of the plurality of pixels may include a CMOS based sensor.

In an embodiment of the inventive concept, provide is a method of generating a depth map using an image sensor including an active pixel sensor array with a plurality of pixels. The method includes: outputting a plurality of signals corresponding to a target from the plurality of pixels; generating depth map profile data based on two selected signals among the plurality of signals; and generating a depth map about the target based on the depth map profile data.

In an embodiment, the active pixel sensor array may include a first pixel to a third pixel disposed in a first row among the plurality of pixels, wherein the generating of the depth map profile data may include: calculating a first difference between a first signal corresponding to the first pixel and a second signal corresponding to the second pixel; calculating a second difference between the second signal corresponding to the second pixel and a third signal corresponding to the third pixel; and generating the depth map based on the first difference and the second difference.

In an embodiment, the active pixel sensor array may include a fourth pixel to a sixth pixel disposed in a second row among the plurality of pixels, wherein the generating of the depth map profile data may include: calculating a third difference between a fourth signal corresponding to the fourth pixel and a fifth signal corresponding to the fifth pixel; calculating a fourth difference between the fifth signal corresponding to the fifth pixel and a sixth signal corresponding to the sixth pixel; and generating the depth map based on the third difference and the fourth difference.

In an embodiment, the calculating of the third difference and the fourth difference may be executed in consideration of a difference of the first signal and the fourth signal.

In an embodiment, the active pixel sensor array may include a first pixel to a fourth pixel disposed in a first row among the plurality of pixels, wherein the generating of the depth map profile data may include: calculating a first difference between a first signal corresponding to the first pixel and a third signal corresponding to the third pixel; calculating a second difference between the second signal corresponding to the second pixel and a fourth signal corresponding to the fourth pixel; and generating the depth map based on the first difference and the second difference.

In an embodiment, the active pixel sensor array may include a first pixel to a fifth pixel disposed in a first row among the plurality of pixels, wherein the generating of the depth map profile data may include: calculating a first difference between a first signal corresponding to the first pixel and a third signal corresponding to the third pixel; calculating a second difference between the third signal corresponding to the third pixel and a fifth signal corresponding to the fifth pixel; and generating the depth map based on the first difference and the second difference.

In an embodiment, each of the plurality of pixels may include a CMOS based sensor.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
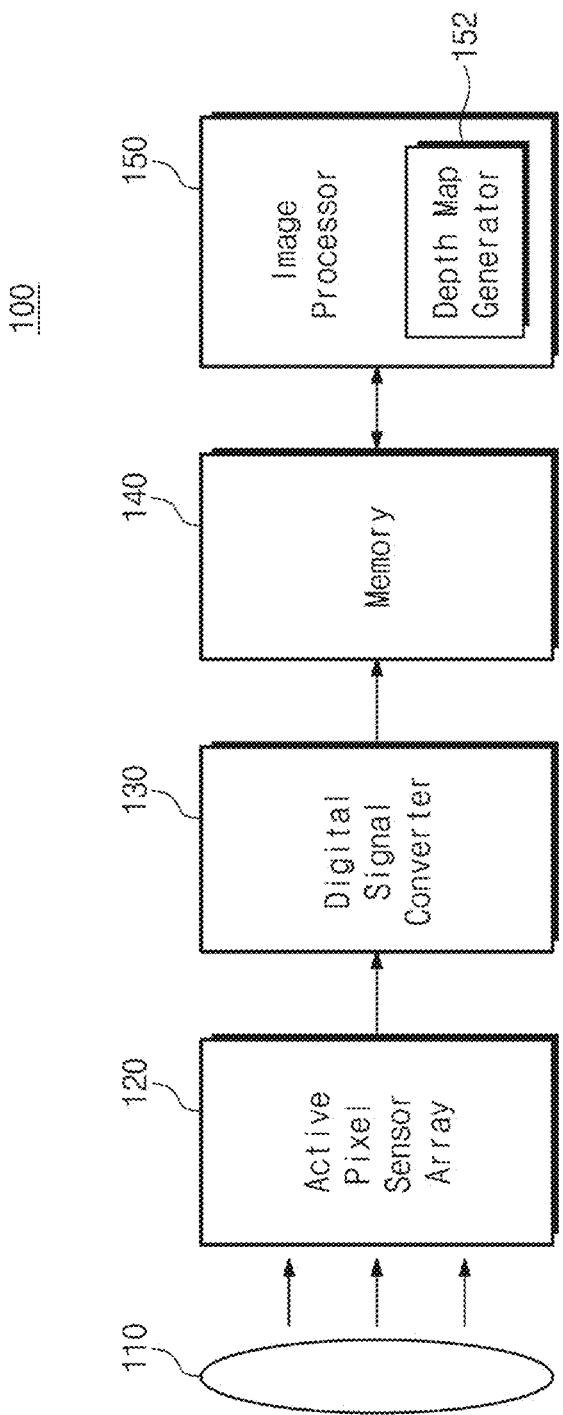
FIG. 1 is a block diagram showing an exemplary configuration of an image processing device according to an embodiment of the inventive concept.

Hereinafter, embodiments of the inventive concept will be described in more detail with reference to the accompanying drawings. In the description below, details such as detailed configurations and structures are simply provided to help overall understanding. Therefore, without departing from the technical idea and scope of the inventive concept, modifications on embodiments described in this specification may be performed by those skilled in the art. Furthermore, descriptions of well-known functions and structures are omitted for clarity and conciseness. The terms used herein are defined in consideration of functions of the inventive concept and are not limited to specific functions. The definition of terms may be determined based on the details in description.

Modules in drawings or detailed description below may be shown in the drawings or may be connected to another component other than components described in detailed description. Each of connections between modules or components may be direct or indirect. Each of connections between modules or components may be a connection by communication or a physical access.

Components described with reference to terms such as parts, units, modules, and layers used in detailed description may be implemented in software, hardware, or a combination thereof. Exemplarily, software may be machine code, firmware, embedded code, and application software. For example, hardware may include an electrical circuit, an electronic circuit, a processor, a computer, an integrated circuit, integrated circuit cores, a pressure sensor, an inertial sensor, microelectromechanical systems (MEMS), a passive device, or a combination thereof.

Unless otherwise defined, all terms including technical or scientific meanings used in the specification have meanings understood by those skilled in the art. In general, the terms defined in the dictionary are interpreted to have the same meanings as contextual meanings and unless they are clearly defined in the specification, are not to be interpreted to have ideal or excessively formal meanings.

FIG. 1 is a block diagram showing an exemplary configuration of an image processing device 100 according to an embodiment of the inventive concept. The image processing device 100 may include a lens 110, an active pixel sensor array 120, a digital signal converter 130, a memory 140, and an image processor 150. For example, the active pixel sensor array 120 and the digital signal converter 130 may be referred to as an image sensor. However, it is named according to convenience, and may be called or classified differently depending on circuit design, merging, packing, and/or the like.

The lens 110 may collect light reflected by a target (not shown) after being emitted from at least one light source. Here, the at least one light source may be sunlight, or a flash of an electronic device equipped with the image processing device 100 of the inventive concept.

The active pixel sensor array 120 may include a plurality of pixels configured to convert an optical signal into an electrical signal. For example, the converted electrical signal may be current or voltage. Each pixel may include at least one light pass filter and at least one photo sensitive sensor. For example, the photo sensitive sensor may be a CMOS based sensor, but is not limited thereto. Each light pass filter may pass any one of red light, green light, and blue light. For example, the active pixel sensor array 120 may include a plurality of pixels disposed along the row and column directions.

The digital signal converter 140 may be configured to process an electrical signal outputted by the active pixel sensor array 120 and to convert the electrical signal into image data, which is a digital signal. For example, the digital signal converter 140 may include, for example, a correlated double sampler, an analog-to-digital converter, and the like.

The correlate double sampler may perform correlated double sampling on an electrical signal outputted from the active pixel sensor array 120. For example, the correlate double sampler may detect a difference between a separately provided reference signal and an electrical signal outputted from the active pixel sensor array 120, and generate an analog signal (i.e., a correlated double sampling signal) based on the difference. The analog-to-digital converter may convert the correlated double sampling signal outputted from the correlate double sampler into image data that is a digital signal.

The memory 140 may store image data outputted from the digital signal converter 130. Further, the memory 140 may store data processed by the image processor 150. For example, the image data outputted from the digital signal converter 130 and stored in the memory 140 may include information about the intensity of an electrical signal outputted from each pixel constituting the active pixel sensor array 120. Then, the data processed by the image processor 150 may include information about the depth map extracted from the information about the intensity of the electrical signal.

The memory 140 may include volatile memory such as Dynamic RAM (DRAM), Synchronous RAM (SDRAM), cache memory, and the like, and nonvolatile memory such as Phase-change RAM (PRAM), Magneto-resistive RAM (MRAM), Resistive RAM (ReRAM), Ferro-electric RAM (FRAM), and the like, but is not limited thereto.

The image processor 150 may perform various calculations/operations on the data outputted from the digital signal converter 130. For example, the image processor 150 may perform calculation/operation to output information about the photographed target to a display device.

Further, the image processor 150 may perform various processing such as bad pixel correction, demosaic, noise filtering, lens shading correction, gamma correction, edge enhancement, and the like. However, this is exemplary, and the image processor 150 may further perform various operations to provide a user with a complete image of the target.

The image processor 150 may be configured to generate a depth map of the target from the image data outputted from the digital signal converter 130. The image data may include information about the magnitude of the electrical signal (i.e., current or voltage) outputted from each pixel. The image processor 140 of the inventive concept may generate a depth map based on the difference value of the electrical signals outputted from two adjacent pixels. Therefore, there is an advantage that a depth map may be generated using only image data without a separate device for generating a depth map. Such a scheme will be described in detail later.

The image processor 150 may include a depth map generator 152 that is implemented to execute a scheme that generates a depth map of the inventive concept. That is, the depth map generator 152 may be a component implemented as hardware. However, the configuration of the depth map generator 152 is not limited thereto. For example, in other embodiments, the depth map generator 152 may be implemented as software or firmware, and may be loaded the in memory 140 and driven by the image processor 150.

Figure 2A:
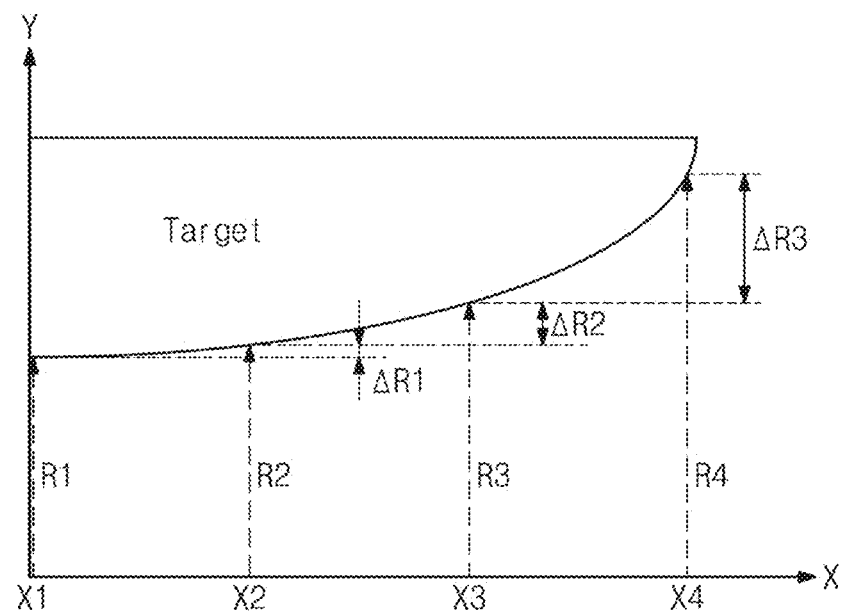
FIGS. 2A to 2C are diagrams for conceptually showing that an image processing device according to an embodiment of an inventive concept generates a depth map from image data.
Figure 2B:
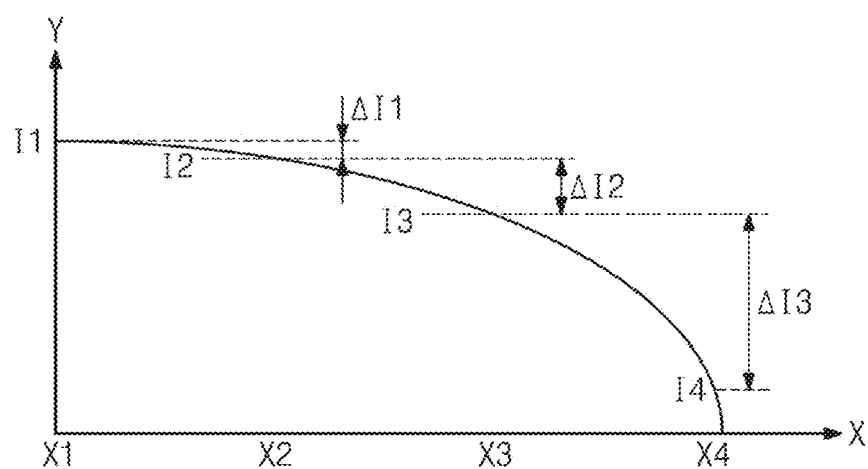
Figure 2C:
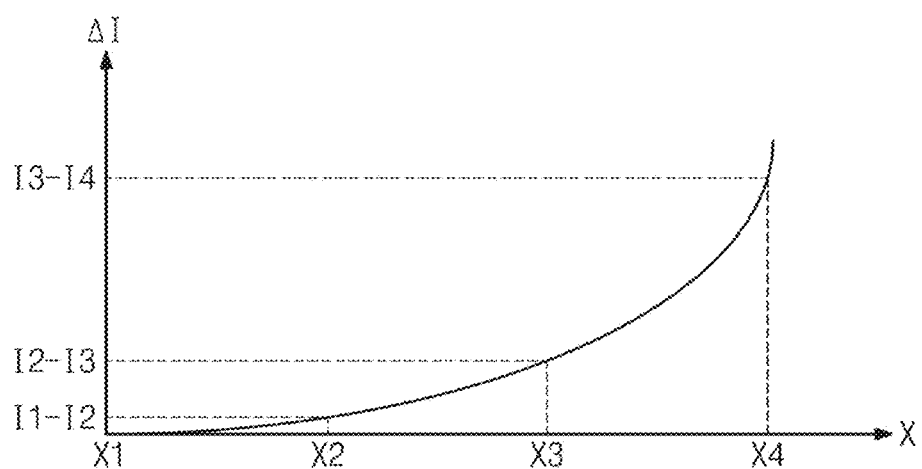

FIGS. 2A to 2C are diagrams for conceptually showing that an image processing device according to an embodiment of an inventive concept generates a depth map from image data. To help understanding of the description, FIG. 1 will be described together. X1, X2, X3, and X4 on the X-axis correspond to the positions of the pixels constituting the active pixel sensor array. However, for the sake of simplicity, only four pixels arranged in one row are considered.

Referring to FIG. 2A, the Y-axis represents the distance from the pixel to the target. The distance from the position X1 of the first pixel to the target is R1 and the distance from the position X2 of the second pixel to the target is R2 and the distance from the position of the third pixel X3 to the target is R3, and the distance from the pixel position X4 to the target is R4. Since the surface of the target has the form of an ellipse, the distance from the pixel to the target drastically increases as it moves along the X-axis direction. That is, $\Delta R1 < \Delta R2 < \Delta R3$.

Referring to FIG. 2B, the Y-axis represents an electrical signal (e.g., current or voltage) outputted from the pixel. The first signal corresponding to the detection at the first pixel is I1, the signal corresponding to the detection at the second pixel is I2, the signal corresponding to the detection at the third pixel is I3, and the signal corresponding to the detection at the fourth pixel is I4.

Generally, because the intensity of light is inversely proportional to the square of the distance, as the distance from the light source increases, the intensity of the light decreases significantly. That is, $\Delta I1 < \Delta I2 < \Delta I3$. Assuming that the distance from the fourth pixel to the target is twice the distance from the first pixel to the target, the intensity of the light incident on the fourth pixel is ¼ times the intensity of the light incident on the first pixel. Therefore, the magnitude of the fourth signal I4 corresponding to the detection at the fourth pixel will be ¼ times the magnitude of the first signal I1 corresponding to the detection at the first pixel.

However, due to various reasons such as the configuration of the pixel, the manufacturing process, and the surrounding environment, the magnitude of the fourth signal I4 corresponding to the detection at the fourth pixel may not be precisely ¼ times the magnitude of the first signal I1 corresponding to the detection at the first pixel. However, since the principle that the intensity of light is inversely proportional to the square of the distance will also be reflected on the magnitude of the signal outputted from the pixel, the curved profile shown in FIG. 2B will be maintained substantially.

FIG. 2C is a graph showing an intensity difference of signals outputted from two adjacent pixels. As shown in FIG. 2B, the signal magnitude decreases greatly as it goes in the X-axis direction, so that a difference between the signal values outputted from the two adjacent pixels greatly increases. For example, the intensity difference between the first signal I1 corresponding to the detection at the first pixel and the second signal I2 corresponding to the detection at the second pixel is very small. However, the intensity difference between the third signal I3 corresponding to the detection at the third pixel and the fourth signal I4 corresponding to the detection at the fourth pixel is very large.

As shown in the waveform of the graph shown in FIG. 2C, it may be seen that it is very similar to the outline of the target shown in FIG. 2A. That is, the depth map generator 152 may directly use information extracted from the shape (profile) of the graph shown in FIG. 2C as a depth map. Alternatively or additionally, the depth map generator 152 may provide a user with the form of the graph shown in FIG. 2C using a display device or the like, so that a three-dimensional image may be provided.

Although the shape (profile) of the graph shown in FIG. 2C does not exactly coincide with the outline of the target shown in FIG. 2A, it may be seen that the waveforms of the two graphs of FIGS. 2A and 2C are very similar. That is, according to an embodiment of the inventive concept, there is an advantage that the depth map of the target may be generated using only a very simple calculation without a separate device for generating the depth map.

Figure 3:
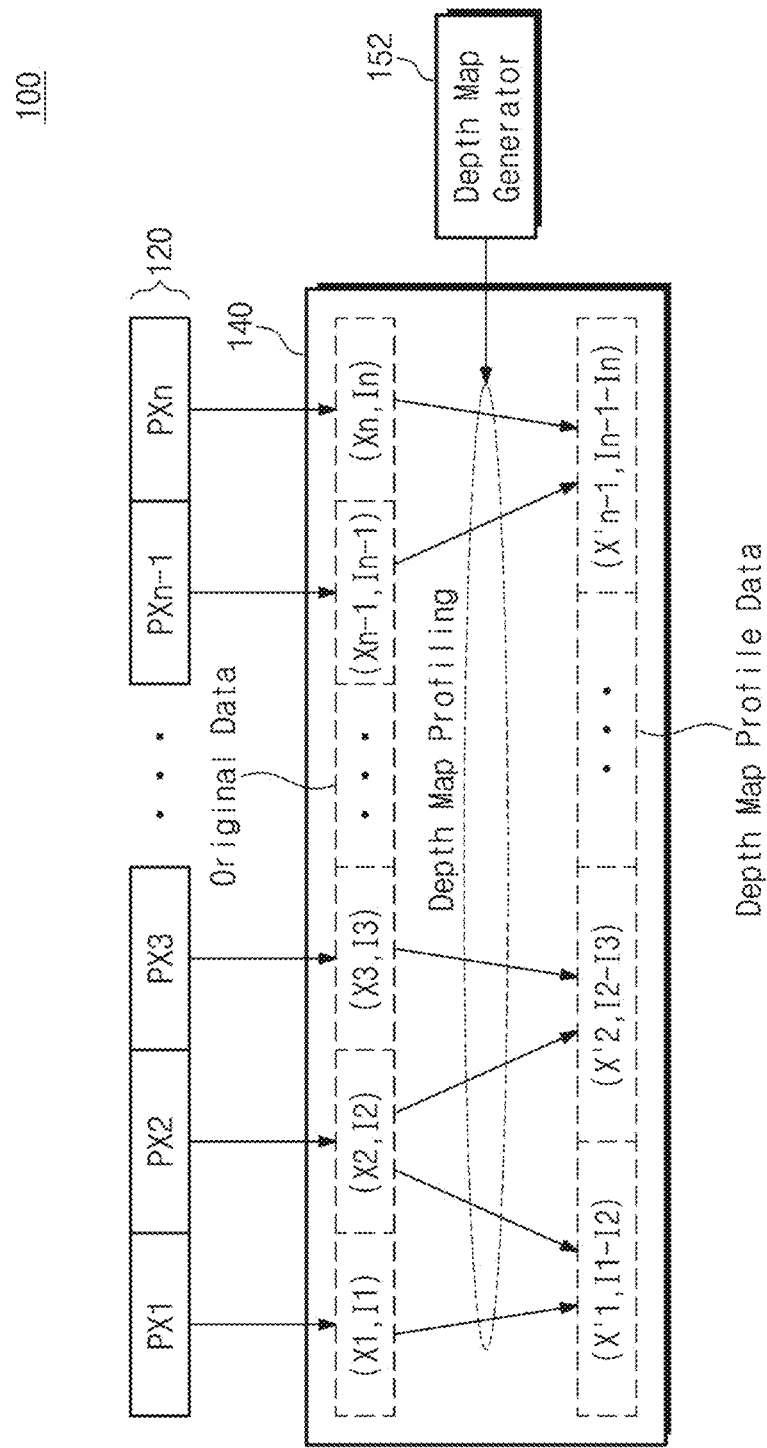
FIG. 3 is a conceptual view illustrating an operation of an image processing device according to an embodiment of the inventive concept.

FIG. 3 is a conceptual view illustrating an operation of an image processing device according to an embodiment of the inventive concept. To help better understanding of the description, FIG. 1 will be described together.

Some pixels PX1 to PXn among the plurality of pixels constituting the active pixel sensor array 120 are shown. However, in order for simple illustration, a digital signal converter for processing an electrical signal received from the active pixel sensor array 120 is not shown in FIG. 3. Each pixel may output image data, and the image data may include information about the distance between the pixel and the target (i.e., the magnitude of the current or voltage).

The memory 140 may store image data. For example, the original data may be generated based on the image data outputted from the digital signal converter 130. The original data may include information about the address of the pixel and information about the magnitude of the electrical signal (e.g., current or voltage). For example, based on the image data outputted from the first pixel PX1, the information X1 relating to the address of the first pixel PX1 and the first signal I1 may be generated. The remaining pixels PX2 to PXn are similar.

The depth map generator 152 may perform depth map profiling on the original data. The depth map generator 152 may calculate the intensity difference of the signals corresponding to the detection at two adjacent pixels. For example, the depth map generator 152 may calculate a magnitude difference (i.e., I1−I2) between the first signal I1 corresponding to the detection at the first pixel PX1 and the second signal I2 corresponding to the detection at the second pixel. Here, X'1 indicates that the address X1 of the first pixel PX1 is related to the address X2 of the second pixel PX2. This operation is also performed for the second pixel PX2 and the third pixel PX3, and is similarly performed for the remaining pixels. As a result, depth map profile data for the outline (or depth) of the target may be generated.

The depth map generator 152 may generate the depth map using the depth map profile data. For example, in providing and capturing the image to the user by the image processing device 100, it is possible to provide a more stereoscopic image by reflecting the depth map.

Figure 4:
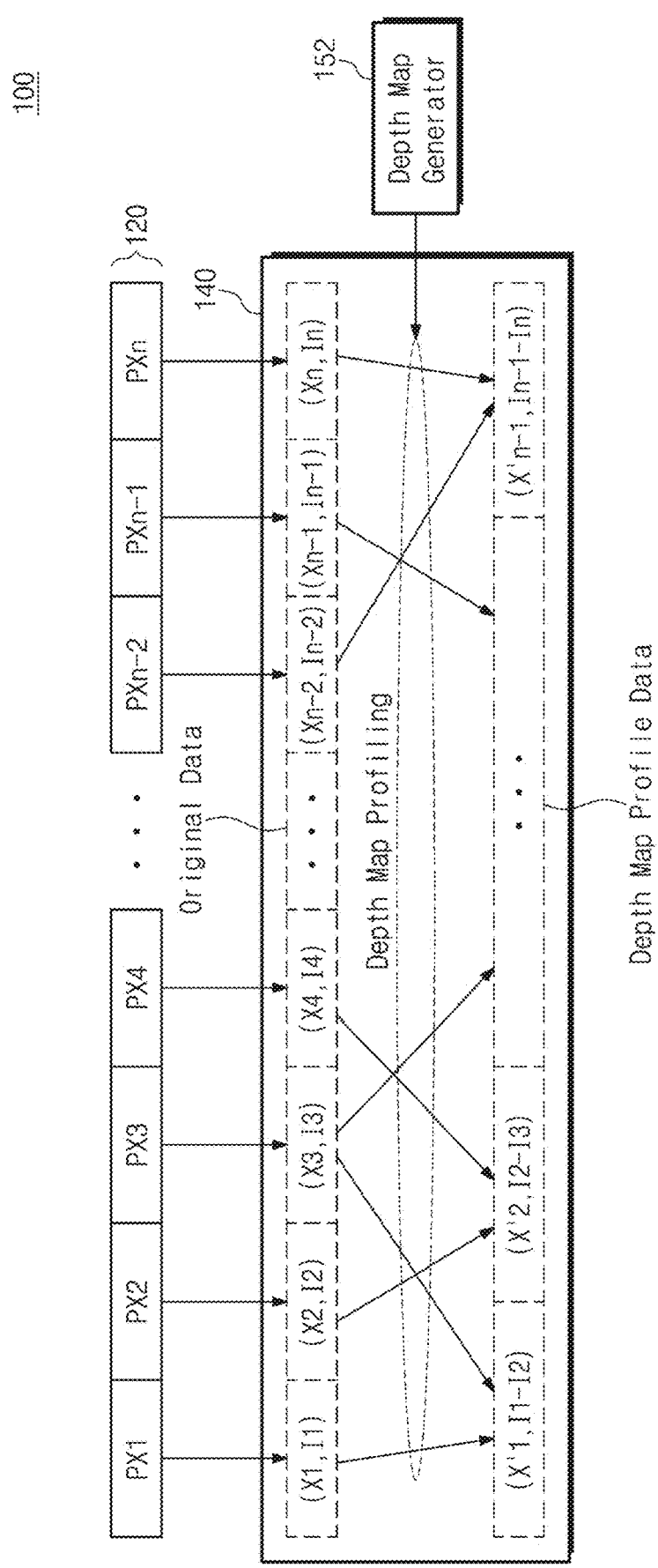
FIG. 4 is a conceptual view illustrating an operation of an image processing device according to an embodiment of the inventive concept.

FIG. 4 is a conceptual view illustrating an operation of an image processing device according to another embodiment of the inventive concept. In this embodiment, unlike the embodiment described above with reference to FIG. 3, electrical signals corresponding to the detection at two pixels that are not adjacent to each other are used. To help better understanding of the description, FIG. 1 will be described together.

In this embodiment, the depth map generator 152 calculate an intensity difference between an electrical signal corresponding to the detection at two pixels (for example, the first pixel PX1) disposed with one pixel interposed therebetween and an electrical signal corresponding to the detection at the third pixel PX3. For example, the depth map generator 152 may calculate a magnitude difference (i.e., I1−I3) between the first signal I1 corresponding to the detection at the first pixel PX1 and the third signal I3 corresponding to the detection at the third pixel PX3. Here, X'1 indicates that the address X1 of the first pixel PX1 is related to the address X3 of the third pixel PX3. This operation is also performed for the second pixel PX2 and the fourth pixel PX4, and is similarly performed for the remaining pixels. As a result, depth map profile data for the outline (or depth) of the target may be generated.

In this embodiment, an example is described in which the depth map is generated based on the intensity difference of the electrical signals outputted from two pixels disposed with one pixel therebetween, but the inventive concept is not limited thereto. For example, in other embodiments, a depth map may be generated based on an intensity difference of electrical signals outputted from two pixels disposed with two or more pixels therebetween.

Figure 5:
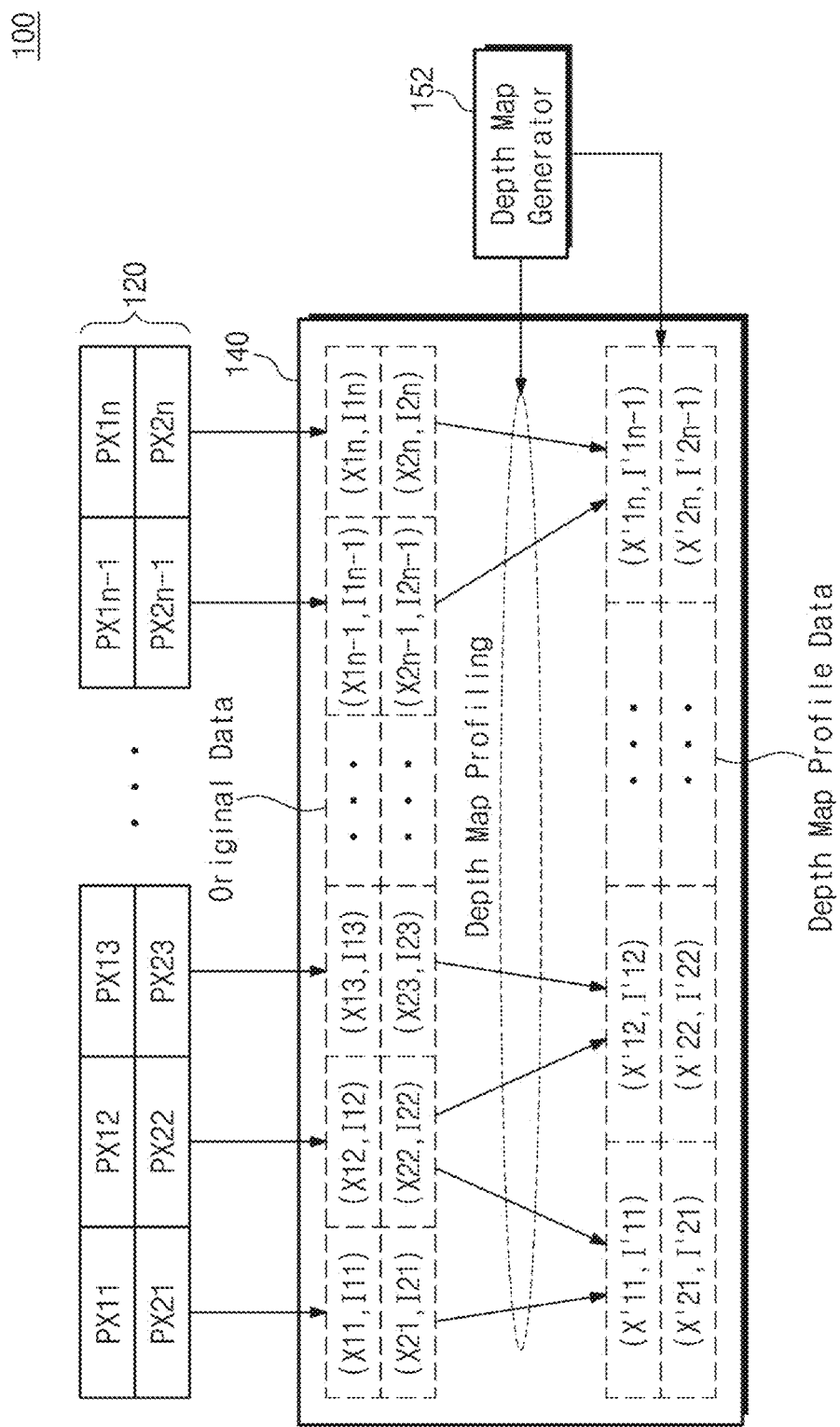
FIG. 5 is a conceptual view illustrating an operation of an image processing device according to an embodiment of the inventive concept.

FIG. 5 is a conceptual view illustrating an operation of an image processing device according to another embodiment of the inventive concept. For simplicity, only the active pixel sensor array 120, the memory 140, and the depth map generator 152 among the components of the image processing device 100 are shown. Among the pixels constituting the active pixel sensor array 120, pixels PX11 to PX1n arranged in the first row and pixels PX21 to PX2n arranged in the second row are shown. X11 in X11 and I11 represents the address of the pixel PX11. I11 represents the magnitude of the electrical signal (e.g., current or voltage) outputted from the pixel PX11, and other pixels are similar.

Unlike the previously described embodiments, which illustrate that a depth map is generated based on the electrical signals outputted from the pixels arranged in one row, when a depth map is generated based on signals outputted from pixels arranged in a plurality of rows, additional calculations may be required. That is, it is necessary to reflect to the depth map the difference between the signal detected by the pixels PX11 to PX1n in the first row and the signal detected by the pixels PX21 to PX2n in the second row.

For example, it is assumed that the intensities of the signals corresponding to the detection in the pixels PX11 and PX12 in the first row are 4 and 3, respectively and the intensities of the signals corresponding to the detection in the pixels PX21 and PX22 in the second row are 2 and 1, respectively. In this case, the intensity difference of the signals corresponding to the detection in the pixels PX11 and PX12 in the first row is 1, and the intensity difference of the signals corresponding to the detection in the pixels PX21 and PX22 in the second row is 1. That is, there is an issue that the depth information is not properly reflected between the signals detected at the pixels in the first row and the signals detected at the pixels in the second row.

Therefore, the depth map generator 152 may reflect to the depth map profile data the intensity difference of signals corresponding to the detection at one (e.g., PX11) of pixels in the first row and at one (e.g., PX12) of the pixels in the second row adjacent thereto. For example, it is assumed that the intensities of the signals corresponding to the detection in the pixels PX11, PX12, PX13, and PX14 in the first row are 4, 3, 4, and 3, respectively and the intensities of the signals corresponding to the detection in the pixels PX21, PX22, PX23, and PX24 in the second row are 2, 1, 2, and 1, respectively.

If it does not reflect the relative depth difference in the column direction, the depth map profile data I'11, I'12, and I'13 are '1', '−1' and '1', respectively, and the depth map profile data I'21, I'22, and I'23 are '1', '−1', and '1', respectively. That is, although it may mean that the depth of the target detected by the pixels PX11, PX12, PX13, and PX14 in the first row and the depth of the target detected by the pixels PX21, PX22, PX23, and PX24 in the second row are the same, this does not provide the correct profile (or depth information) of the target.

However, if the relative depth difference is reflected in the column direction, the correct depth information may be provided. For example, during performing profiling based on signals detected by the pixels PX21, PX22, PX23, and PX24 in the second row, if the signal intensity difference between the pixel PX11 and the pixel PX21 is reflected, the depth map profile data I'11, I'12, and I'13 are '1', '−1', and '1', respectively, and the depth map profile data I'21, I'22, and I'23 are '−1', '−3', and '−1', respectively. That is, it may know that the portion of the target detected by the pixels PX21, PX22, and PX23 in the second row is deeper overall than the portion of the target detected by the pixels PX11, PX12, and PX13 in the first row.

Although pixels in two rows are described as an example for the sake of simplicity of the illustration, the present embodiment will be applied equally to pixels in more than two rows.

Figure 6:
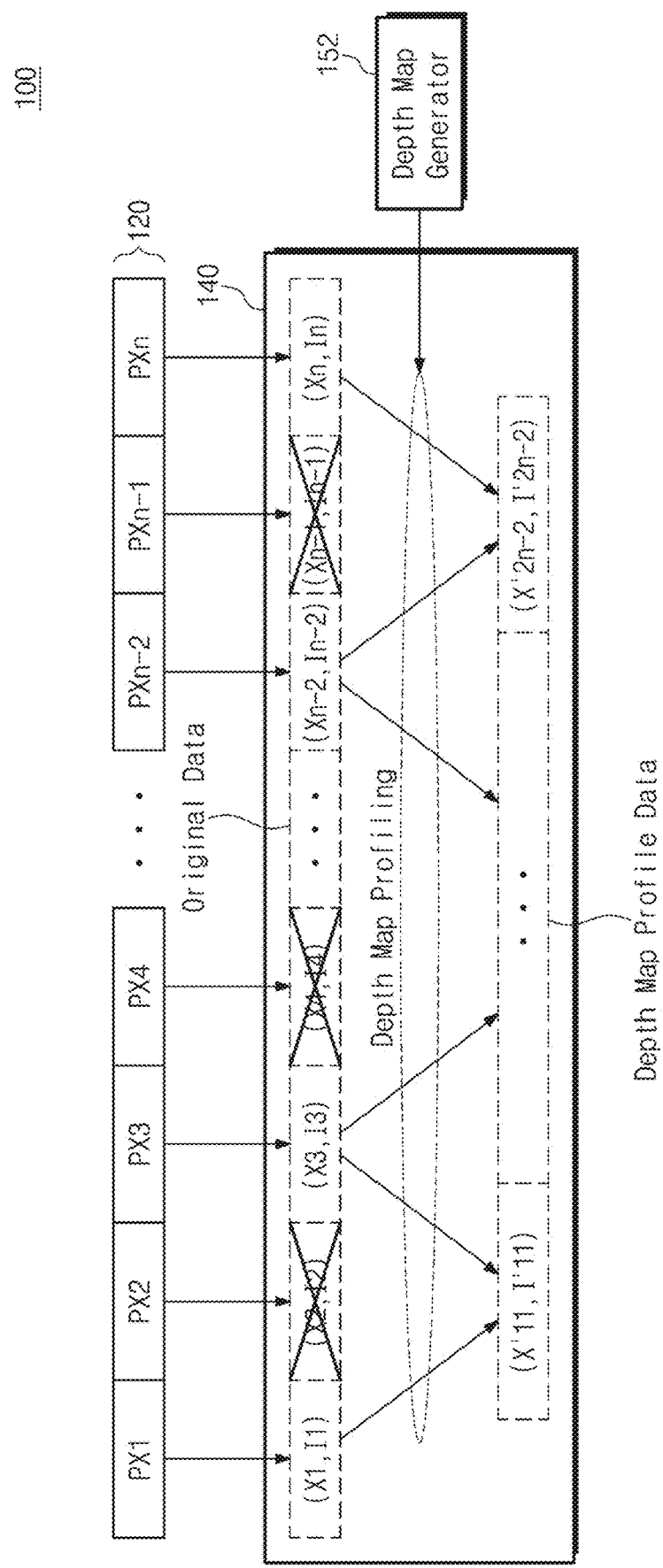
FIG. 6 is a conceptual view illustrating an operation of an image processing device according to an embodiment of the inventive concept.

FIG. 6 is a conceptual view illustrating an operation of an image processing device according to another embodiment of the inventive concept. In this embodiment, a technique for reducing the number of pixels of a depth map (that is, reducing the resolution) will be described.

The addresses of the first to n-th pixels PX1 to PXn are X1 to Xn, respectively and the intensities of electrical signals corresponding to the detection at the first to n-th pixels PX1 to PXn are I1 to In, respectively. In this embodiment, the depth map generator 152 may use only some of the electrical signals I1 to In, and may not use the remaining.

For example, the depth map generator 152 may generate the depth map profile data I'11 based on the magnitude difference of the electrical signal I1 corresponding to the detection at the first pixel PX1 and the electrical signal I3 corresponding to the detection at the third pixel PX3. Similarly, the depth map generator 152 may generate the depth map profile data I'33 based on the magnitude difference of the electrical signal I3 corresponding to the detection at the first pixel PX1 and the electrical signal I3 corresponding to the detection at the fifth pixel PX5. Other depth map profile data is generated in a similar manner.

According to such a scheme, electrical signals outputted from the pixels PX2, PX4, PX6, and so on disposed in the even-numbered columns among the pixels are not considered. That is, according to this scheme, a depth map similar to that in which the number of pixels is reduced to about ½ may be obtained.

Figure 7:
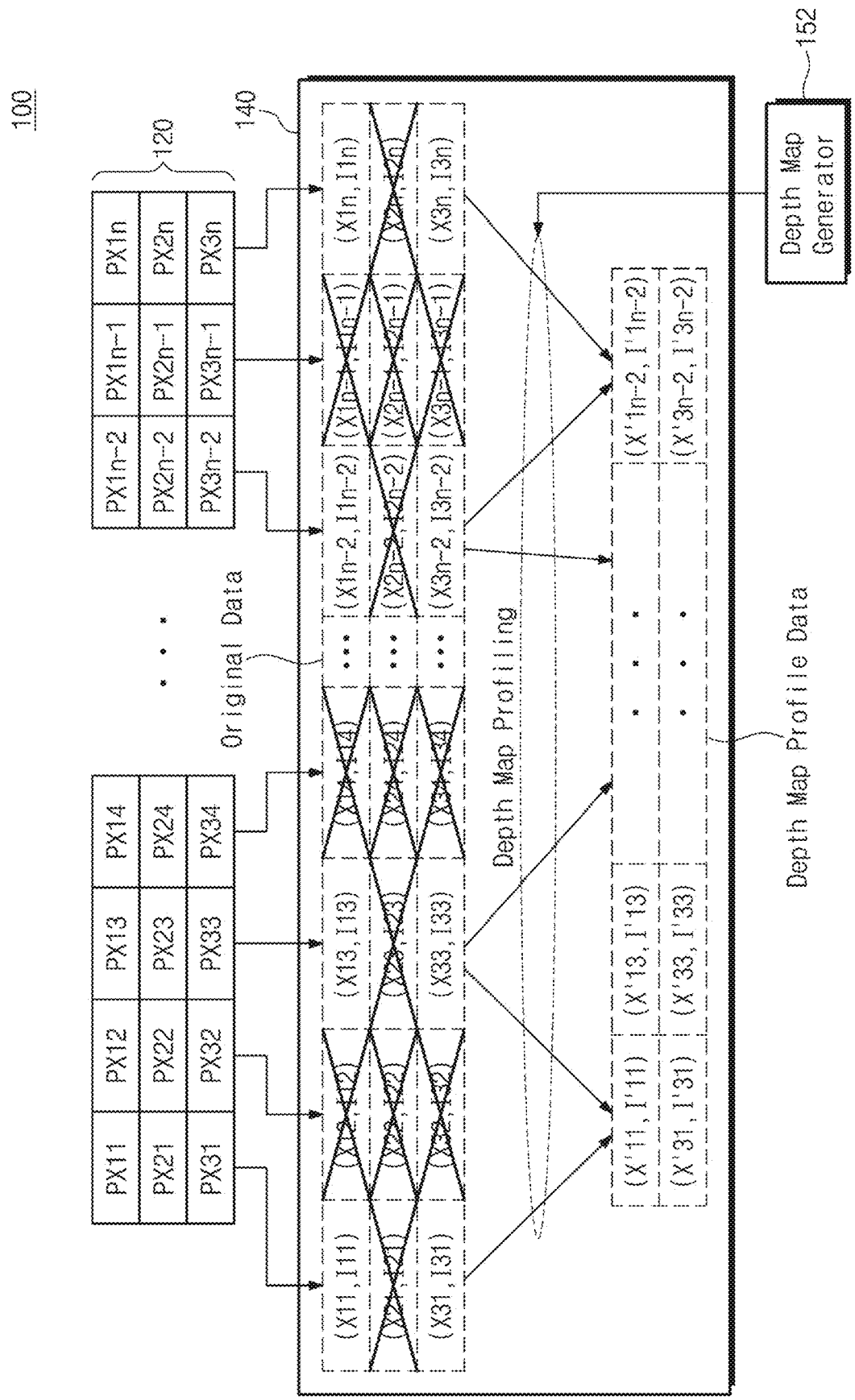
FIG. 7 is a conceptual view illustrating an operation method of an image processing device according to another embodiment of the inventive concept.

FIG. 7 is a conceptual view illustrating an operation method of an image processing device according to another embodiment of the inventive concept. In this embodiment, a technique for reducing the number of pixels of the depth map that is extended in the row direction and also in the column direction will be described.

The addresses of the pixels PX11 to PX1n in the first row are X11 to X1n, respectively and the electrical signals corresponding to the detection at the pixels PX11 to PX1n are I11 to I1n, respectively. The addresses of the pixels PX21 to PX2n in the second row are X21 to X2n, respectively and the electrical signals corresponding to the detection at the pixels PX21 to PX2n are I21 to I2n, respectively. The addresses of the X31 to X3n in the third row are X31 to X3n, respectively, and the electrical signals corresponding to the detection at the pixels PX31 to PX3n are I31 to I3n, respectively.

In this embodiment, the electrical signals corresponding to the detection at the pixels (e.g., PX12, PX14, PX16, and so on) disposed in the even-numbered columns among the pixels arranged in the row direction are not considered. Similarly, electrical signals corresponding to the detection at the pixels disposed in even-numbered rows (i.e., second row, fourth row, sixth row, and so on) are not considered. The original data related to the pixel which is not considered is indicated by an 'X' in the drawing.

The depth map generator 152 may perform a depth map generation calculation associated with pixels disposed in the first row of the active pixel sensor array 120. The depth map generator 152 may generate the profile data X'11 and I'11 by calculating the magnitude difference of the signals I11 and I13 corresponding to the detection at the pixels PX11 and PX13. The depth map generator 152 may generate the profile data X'13 and I'13 by calculating the magnitude difference of the signals I11 and I13 corresponding to the detection at the pixels PX11 and PX13. This operation is similarly performed on the remaining pixels (e.g., PX15, PX17, PX19, and so on).

The depth map generator 152 may perform a calculation (or an operation) for generating a depth map associated with pixels disposed in the third row of the active pixel sensor array 120. The depth map generator 152 may generate the profile data X'31 and I'31 by calculating the magnitude difference of the signals I11 and I13 corresponding to the detection at the pixels PX11 and PX13. The depth map generator 152 may generate the profile data X'33 and I'33 by calculating the magnitude difference of the signals I33 and I35 corresponding to the detection at the pixels PX33 and PX35. This operation is similarly performed on the remaining pixels (e.g., PX35, PX37, PX39, and so on).

On the other hand, it is necessary to reflect to the depth map profile data the relative depth difference between the depth map profile data associated with the pixels at the first row and the depth map profile data associated with the pixels at the second row. This may be solved by reflecting the intensity difference of the signal detected by the pixel PX11 in the first row and the signal detected by the pixel PX13 in the third row when calculating the signal intensity differences '31, I'33, I'35, and so on. Since such a scheme is similar to that described above with reference to FIG. 5, redundant description will be omitted.

Figure 8:
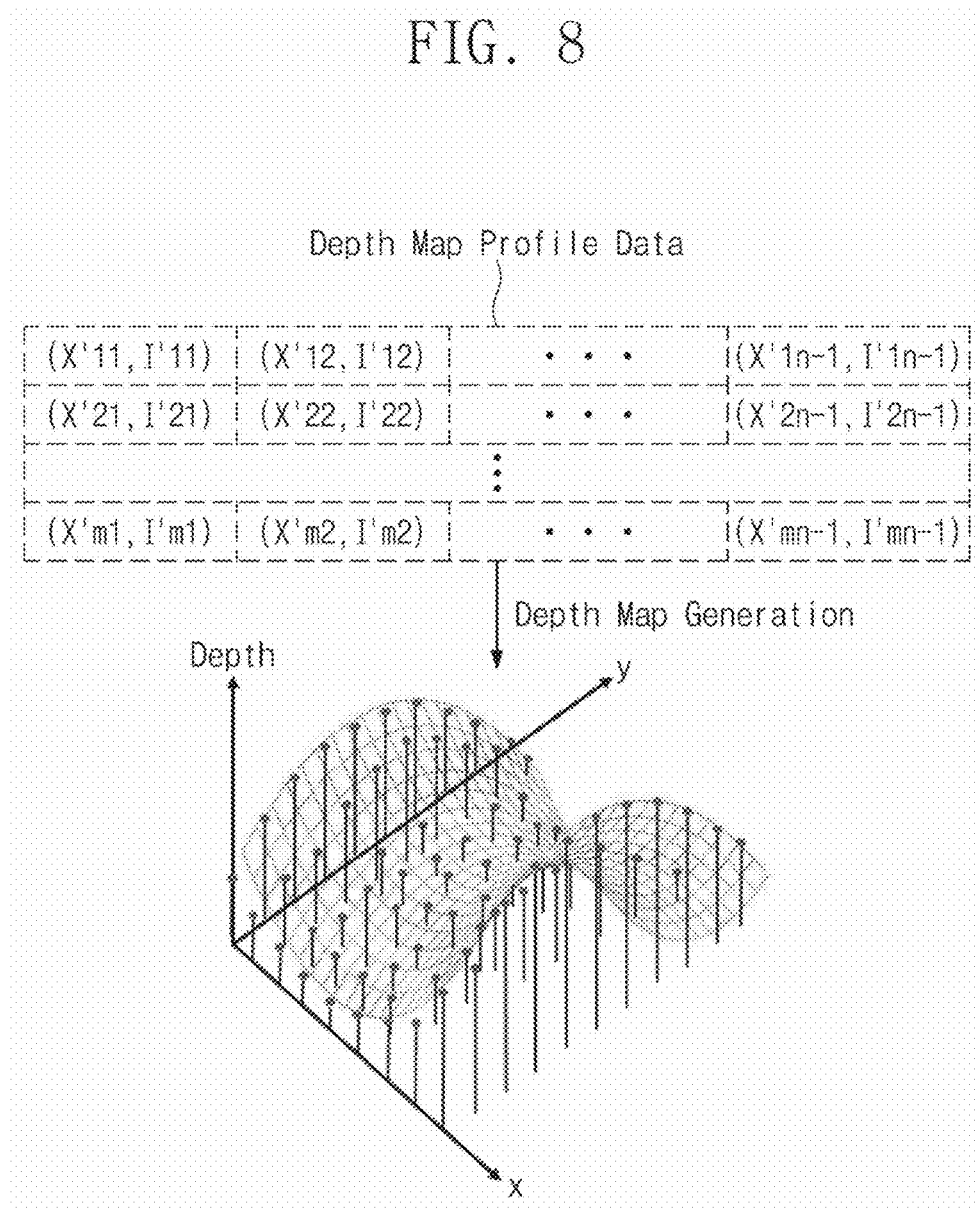
FIG. 8 is an exemplary diagram illustrating generating a depth map by using depth map profile data generated according to an embodiment of the inventive concept.

FIG. 8 is an exemplary diagram illustrating generating a depth map by using depth map profile data generated according to an embodiment of the inventive concept. To help better understanding of the description, FIGS. 1 and 3 to 8 will be described together.

According to the embodiments described above with reference to FIGS. 3 to 7, depth map profile data may be generated. The depth map profile data may be generated based on all or a portion of the electrical signals outputted from the pixels constituting the active pixel sensor array 120.

The depth map generator 152 may generate a depth map or a three-dimensional image using the pixel addresses of depth map profile data and the intensity differences of electrical signals. In the graph shown in FIG. 8, the x-axis and the y-axis represent the addresses of pixels. As shown in the drawing, it may be seen that the target depth map is generated using only the difference of the electrical signals corresponding to the detection at two adjacent pixels. Such a depth map or three-dimensional image may be provided to a user through a separate display device.

Figure 9:
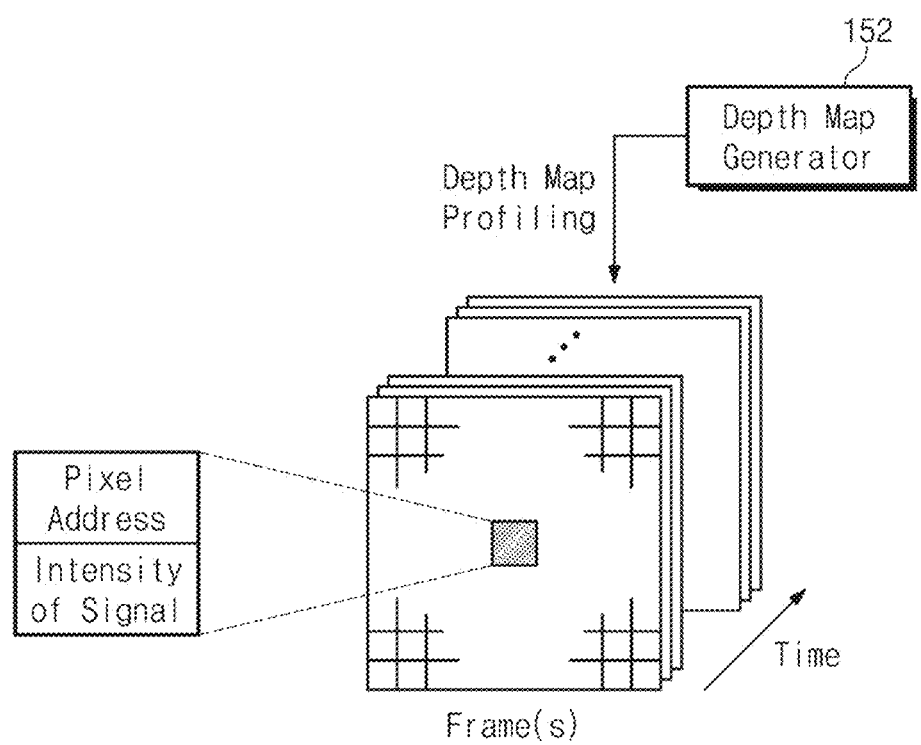
FIG. 9 is a conceptual view that illustrates generating a depth map video or a three-dimensional video according to an embodiment of the inventive concept.

FIG. 9 is a conceptual view that illustrates generating a depth map video or a three-dimensional video according to an embodiment of the inventive concept.

Referring to FIG. 9, a plurality of frames generated as time passes are shown. Each frame may include a plurality of units corresponding to respective pixels constituting an active pixel sensor array (see 120 in FIG. 1). Each unit may contain information about the address of a pixel and the intensity of a signal. Here, the intensity of a signal may mean the magnitude of an electrical signal corresponding to the detection at a pixel.

The depth map generator 152 may perform the depth map profiling described in the previous embodiments for each of the frames that are generated as time passes. As a result, a depth map for each frame may be generated, so that a depth map video or a target three-dimensional video may be generated.

Figure 10:
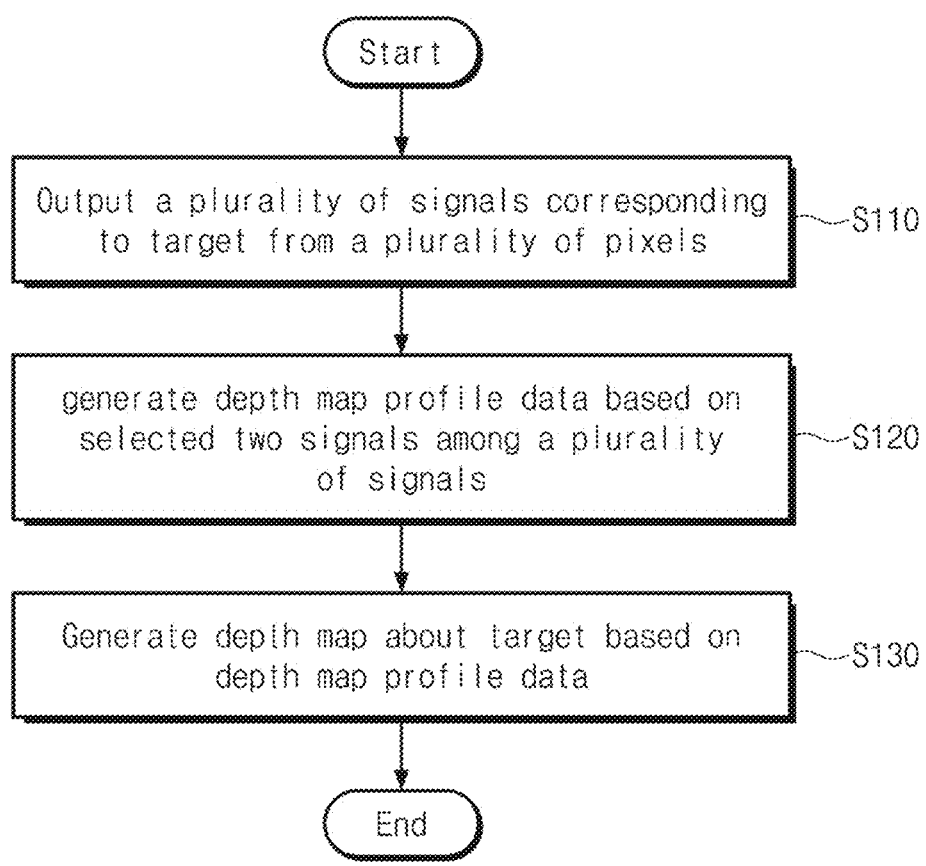
FIG. 10 is a flowchart illustrating a process of generating a depth map according to an embodiment of the inventive concept.

FIG. 10 is a flowchart showing a process of generating a depth map according to an embodiment of the inventive concept. To help understanding of the description, FIG. 1 will be described together.

In operation S110, a plurality of signals corresponding to the target may be outputted from a plurality of pixels. The signal outputted from the pixels may refer to an electrical signal (e.g., current or voltage) generated as a pixel detects/captures the target. For example, the image processor 150 may manage the electrical signals outputted from pixels and the original data on the addresses of the pixels as a table. The original data may be stored in the memory 140. For example, each of the plurality of pixels may be based on CMOS.

In operation S120, the intensity difference of the two signals corresponding to the detection at two pixels among the plurality of signals of the original data may be calculated. The set of intensity difference values of the two signals may constitute depth map profile data. The set of intensity difference values of the two signals has a shape that is substantially similar to the shape of the actual depth map of the target, as described above through FIGS. 2A to 2C.

In another embodiment, instead of using signals corresponding to the detection at two adjacent pixels, signals corresponding to the detection between two adjacent pixels with at least one pixel therebetween may be used. (see FIG. 4). In another embodiment, in order to use the pixel count reduction technique of the depth map, in the depth map profiling process, only signals corresponding to the detection at some of the entire pixels may be used. (see FIGS. 6 and 7).

In operation S130, a depth map may be generated based on the depth map profile data. For example, a depth map may be added to an image of a target to provide a more stereoscopic image. Alternatively or additionally, the depth map may be used to generate a three-dimensional image of the target surface. For example, images and 3D images generated using a depth map may be visually provided to a user through a display device.

Figure 11:
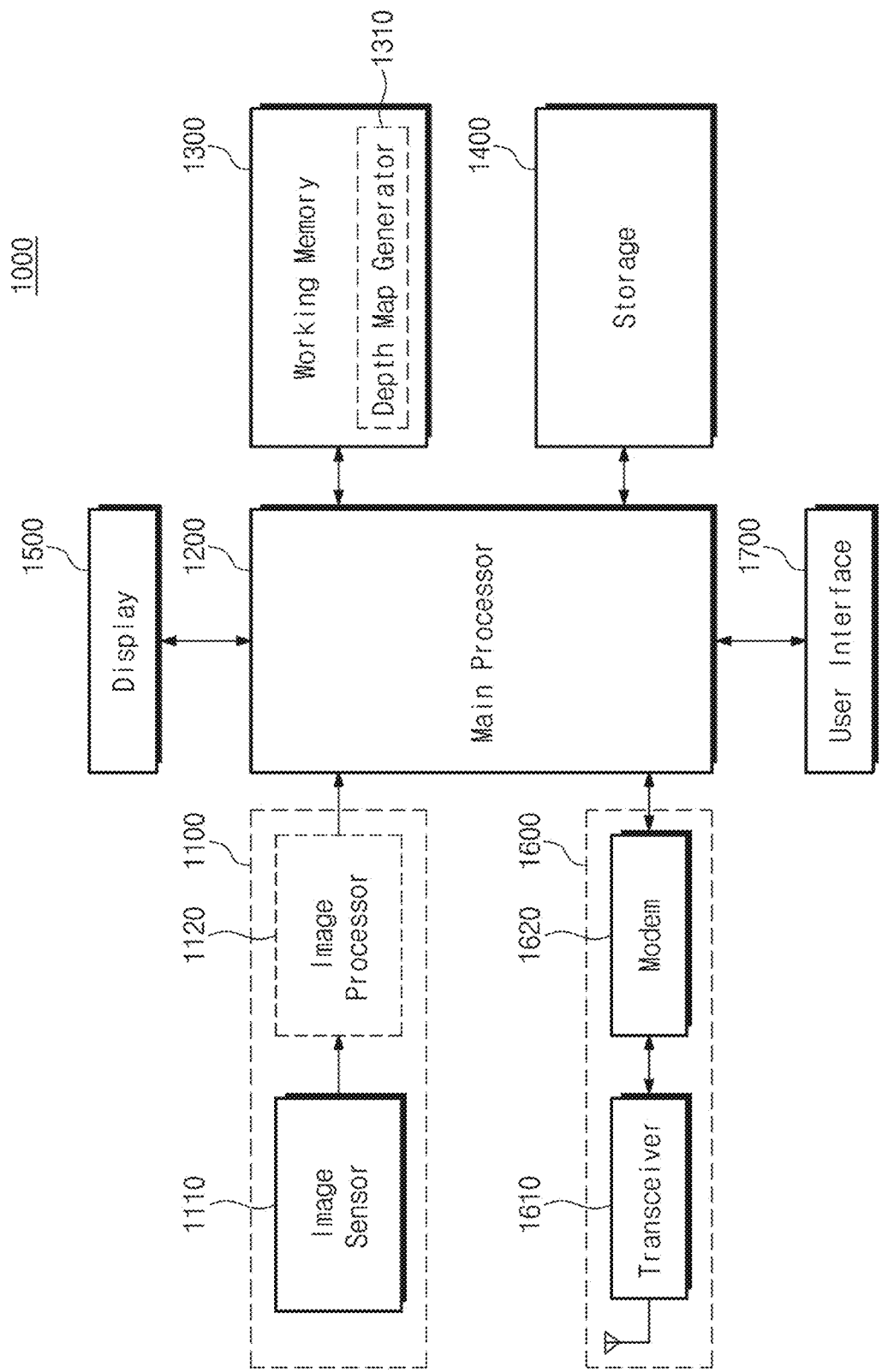
FIG. 11 is an exemplary block diagram showing an electric device to which an image processing device is applied according to an embodiment of the inventive concept.

FIG. 11 is an exemplary block diagram showing an electric device to which an image processing device is applied according to an embodiment of the inventive concept. For example, an electronic device 1000 may be implemented as a smart phone, a tablet computer, a desktop computer, a laptop computer, or a wearable device. Further, the electronic device 1000 may be implemented as one of various types of electronic devices required to operate an unmanned security system, Internet of Things, and an autonomous vehicle The electronic device 100 includes an image processing device 1100, a main processor 1200, a working memory 1300, a storage 1400, a display 1500, a communication block 1600, and a user interface 1700.

The image processing device 1100 may be an image processing device implemented to execute the schemes described above with reference to FIGS. 1 to 10.

Moreover, the depth map generation scheme may be performed by the main processor 1200 as software or firmware instead of the image processor 1120. In this case, the depth map generator 1310, which is firmware or software that implements the depth map generation scheme, may be loaded into the working memory 1300 and the main processor 1200 may drive the depth map generator 1310. In this case, since the depth map generation scheme is driven/processed by the main processor 1200, the processor 1120 may be omitted.

The working memory 1300 may store data used in the operation of the electronic device 1000. For example, the working memory 1300 may temporarily store data processed by the image processor 1120. For example, the working memory 1300 may include volatile memory such as Dynamic RAM (DRAM), Synchronous RAM (SDRAM), cache memory, and the like, and nonvolatile memory such as Phase-change RAM (PRAM), Magneto-resistive RAM (MRAM), Resistive RAM (ReRAM), Ferro-electric RAM (FRAM).

The storage 1400 may store firmware or software for performing the depth map generation scheme. The firmware or software for performing the depth map generation scheme may be read from the storage 1400 and loaded into the working memory 1300 according to a request or command of the main processor 1200. The storage 1400 may include non-volatile memory such as flash memory, PRAM, MRAM, ReRAM, FRAM, and the like.

The display 1500 may include a display panel and a display serial interface (DSI) peripheral circuitry. For example, the display panel may be implemented by various devices such as a liquid crystal display (LCD) device, a light emitting diode (LED) display device, an organic light emitting diode (OLED) display device, an Active Matrix OLED (AMOLED), and the like. The DSI host built in the main processor 1200 may perform serial communication with the display panel through the DSI. The DSI peripheral circuit may include a timing controller, a source driver, and the like necessary for driving the display panel.

The communication block 1600 may exchange signals with an external device/system via an antenna. A transceiver 1610 and a Modulator/Demodulator (MODEM) 1620 of the communication block 1600 may process signals exchanged with an external device/system according to the wireless communication protocol such as Long Term Evolution (LTE), Worldwide Interoperability for Microwave Access (WIMAX), Global System for Mobile communication (GSM), Code Division Multiple Access (CDMA), Bluetooth, Near Field Communication (NFC), Wireless Fidelity (Wi-Fi), Radio Frequency Identification (RFID), and the like.

The user interface 1700 may include at least one of input interfaces such as a keyboard, a mouse, a keypad, a button, a touch panel, a touch screen, a touch pad, a touch ball, a gyroscope sensor, a vibration sensor, an acceleration sensor, and the like.

The components of the electronic device 1000 may exchange data based on at least one of various interface protocols such as Universal Serial Bus (USB), Small Computer System Interface (SCSI), Peripheral Component Interconnect Express (PCIe), Mobile PCIe (M-PCIe), Advanced Technology Attachment (ATA), Parallel ATA (PATA), Serial ATA (SATA), Serial Attached SCSI (SAS), Integrated Drive Electronics (IDE), Enhanced IDE (EIDE), Nonvolatile Memory Express (NVMe), Universal Flash Storage (UFS), and the like.

According to the depth map generation algorithm described above, the depth map of the target may be generated using only the existing CMOS-based image sensor, without a separate device required in the time of flight (TOF) method. Since the intensity difference of signals corresponding to adjacent pixels is used, the configuration of a calculation/circuit may be simplified, so that the operation speed of an image processing device may be improved in generating a depth map.

According to the inventive concept, a depth map may be generated using an existing image sensor without a separate device for generating a depth map.

Since the target depth map is generated using a simple calculation without a separate device, the manufacturing cost of the image processing device may be reduced and the calculation speed of the image processing device may be improved.

Although the exemplary embodiments of the inventive concept have been described, it is understood that the inventive concept should not be limited to these exemplary embodiments but various changes and modifications can be made by one ordinary skilled in the art within the spirit and scope of the inventive concept as hereinafter claimed.

What is claimed is:

1. An image processing device comprising:
   an active pixel sensor array including a plurality of pixels configured to generate a plurality of signals corresponding to a target; and
   an image processor configured to generate a depth map about the target based on an intensity difference between at least two signals among the plurality of signals, the at least two signals respectively corresponding to at least two adjacent pixels among the plurality of pixels;
   wherein the depth map is generated without a light source other than natural light;
   wherein the active pixel sensor array comprises a first pixel to a third pixel disposed in a first row among the plurality of pixels,
   wherein the image processor is further configured to generate the depth map based on:
      a first difference between a first signal corresponding to the first pixel and a second signal corresponding to the second pixel; and
      a second difference between the second signal corresponding to the second pixel and a third signal corresponding to the third pixel;
   wherein the active pixel sensor array further comprises a fourth pixel to a sixth pixel disposed in a second row among the plurality of pixels, and
   wherein the image processor is further configured to generate the depth map based on:
      a third difference between a fourth signal corresponding to the fourth pixel and a fifth signal corresponding to the fifth pixel; and
      a fourth difference between the fifth signal corresponding to the fifth pixel and a sixth signal corresponding to the sixth pixel.

2. The image processing device of claim 1, wherein the processor reflects a difference between the first signal and the fourth signal when calculating the third difference and the fourth difference.

3. The image processing device of claim 1, wherein the active pixel sensor array comprises the first pixel to a fourth pixel disposed in the first row among the plurality of pixels,
   wherein the image processor is further configured to generate the depth map based on:
      a fifth difference between the first signal corresponding to the first pixel and the third signal corresponding to the third pixel; and
      a sixth difference between the second signal corresponding to the second pixel and a seventh signal corresponding to the fourth pixel disposed in the first row.

4. The image processing device of claim 1, wherein the active pixel sensor array comprises the first pixel to a fifth pixel disposed in the first row among the plurality of pixels,
   wherein the image processor is further configured to generate the depth map based on:
      a fifth difference between the first signal corresponding to the first pixel and the third signal corresponding to the third pixel; and
      a sixth difference between the third signal corresponding to the third pixel and a seventh signal corresponding to the fifth pixel disposed in the first row.

5. An image processing device comprising:
   an active pixel sensor array including a plurality of pixels configured to receive optical signals reflected from a target and convert the optical signals into electrical signals;
   a digital signals converter configured to process the electrical signals to generate intensity values of the electrical signals;
   a memory configured to store the processed electrical signals and the intensity values of the electrical signals; and
   an image processor configured to calculate a difference between two intensity values corresponding respectively to at least two adjacent pixels among the plurality of pixels, selected from the intensity values, and generate a depth map about the target based on the difference, without a light source other than natural light;
   wherein the active pixel sensor array comprises first to third pixels disposed in a first row among the plurality of pixels,
   wherein the first to third pixels correspond to first to third intensity values of the electrical signals, respectively, and
   wherein the image processor is further configured to generate the depth map based on:
      a first difference between the first intensity value and the second intensity value; and
      a second difference between the second intensity value and the third intensity value; and
   wherein the active pixel sensor array further comprises fourth pixel to sixth pixels disposed in a second row among the plurality of pixels,
   wherein the fourth to sixth pixels correspond to fourth to sixth intensity values of the electrical signals, respectively, and
   wherein the image processor is further configured to generate the depth map based on:
      a third difference between the fourth intensity value and the fifth; and a fourth difference between the fifth intensity value and the sixth intensity value.

6. The image processing device of claim 1, further comprising a digital signal converter configured to convert the signals to digital signals.

7. The image processing device of claim 1, wherein each of the plurality of pixels comprises a CMOS based sensor.

8. A method of generating a depth map using an image sensor including an active pixel sensor array with a plurality of pixels, the method comprising:
 outputting a plurality of signals corresponding to a target from the plurality of pixels;
  generating depth map profile data based on an intensity difference between at least two selected signals among the plurality of signals, the at least two signals respectively corresponding to at least two adjacent pixels among the plurality of pixels; and
  generating a depth map about the target based on the depth map profile data without a light source other than natural light;
 wherein the active pixel sensor array comprises a first pixel to a third pixel disposed in a first row among the plurality of pixels,
 wherein the generating of the depth map profile data comprises:
 calculating a first difference between a first signal corresponding to the first pixel and a second signal corresponding to the second pixel;
 calculating a second difference between the second signal corresponding to the second pixel and a third signal corresponding to the third pixel; and
 generating the depth map based on the first difference and the second difference;
 wherein the active pixel sensor array further comprises a fourth pixel to a sixth pixel disposed in a second row among the plurality of pixels,
 wherein the generating of the depth map profile data further comprises:
 calculating a third difference between a fourth signal corresponding to the fourth pixel and a fifth signal corresponding to the fifth pixel;
 calculating a fourth difference between the fifth signal corresponding to the fifth pixel and a sixth signal corresponding to the sixth pixel; and
 generating the depth map based on the third difference and the fourth difference.

9. The method of claim 8, wherein the calculating of the third difference and the fourth difference is executed in consideration of a difference of the first signal and the fourth signal.

10. The method of claim 8, wherein the active pixel sensor array comprises the first pixel to a fourth pixel disposed in the first row among the plurality of pixels,
 wherein the generating of the depth map profile data further comprises:
 calculating a fifth difference between the first signal corresponding to the first pixel and the third signal corresponding to the third pixel;
 calculating a sixth difference between the second signal corresponding to the second pixel and a seventh signal corresponding to the fourth pixel disposed in the first row; and
 generating the depth map based on the fifth difference and the sixth difference.

11. The method of claim 8, wherein the active pixel sensor array comprises the first pixel to a fifth pixel disposed in the first row among the plurality of pixels,
 wherein the generating of the depth map profile data comprises:
 calculating a fifth difference between the first signal corresponding to the first pixel and the third signal corresponding to the third pixel;
 calculating a sixth difference between the third signal corresponding to the third pixel and a seventh signal corresponding to the fifth pixel disposed in the first row; and
 generating the depth map based on the fifth difference and the sixth difference.

12. The method of claim 8, wherein each of the plurality of pixels comprises a CMOS based sensor.

13. The image processing device of claim 5, wherein the processor reflects a difference between the first intensity value and the fourth intensity value when calculating the third difference and the fourth difference.

* * * * *